J. SMITH.
Interfering Pad for Horses.
No. 105,990.　　　　　　　　　　　　Patented Aug. 2, 1870.
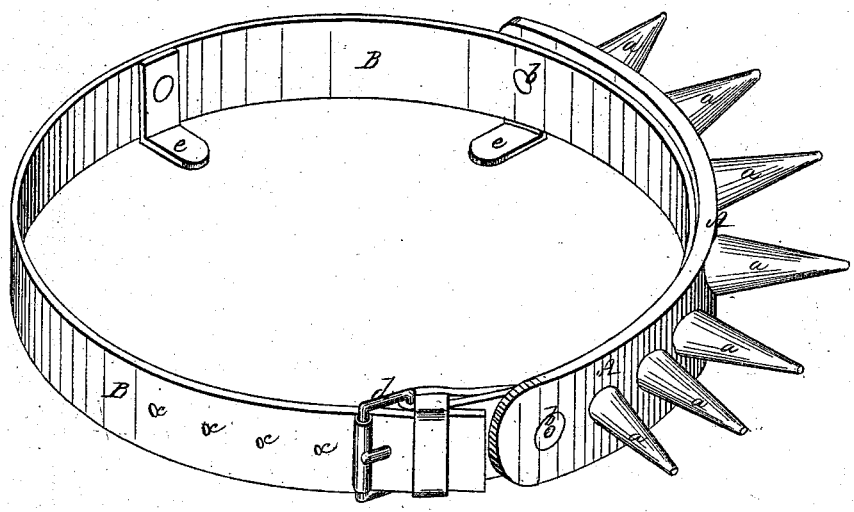
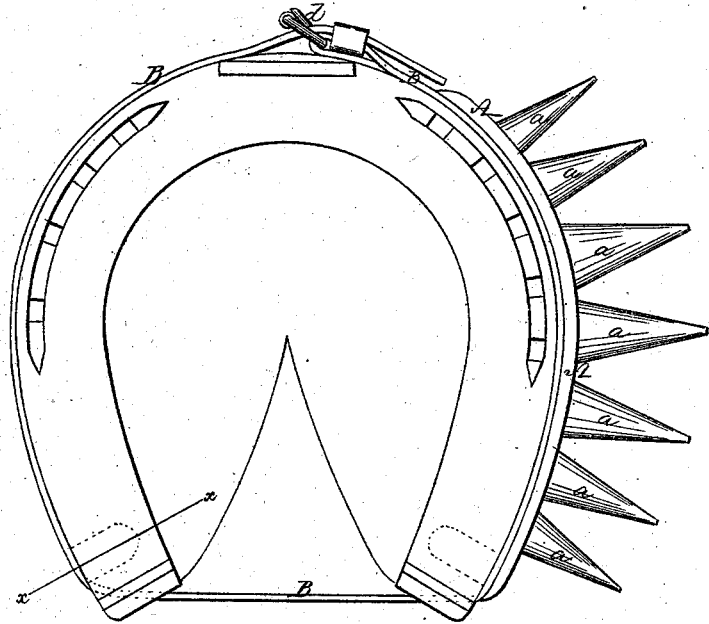
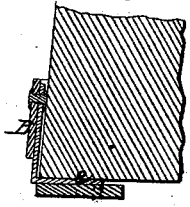

United States Patent Office.

JOHN SMITH, OF BOSTON, MASSACHUSETTS.

Letters Patent No. 105,990, dated August 2, 1870.

IMPROVEMENT IN INTERFERING-PAD FOR HORSES.

The Schedule referred to in these Letters Patent and making part of the same.

*To all whom it may concern:*

Be it known that I, JOHN SMITH, of Boston, in the county of Suffolk and State of Massachusetts, have invented an Improvement in Interfering-Pads for Horses, of which the following is a full, clear, and exact description, reference being had to the accompanying drawing making part of this specification, in which—

Figure 1 is a perspective view of an interfering-pad with my improvement applied thereto.

Figure 2 is a plan of the under side of a horse's hoof with a shoe thereon, and representing the position and manner of securing my improved pad thereto.

Figure 3 is a vertical section through the rear portion of the hoof and shoe, on the line $x\,x$ of fig. 2.

Interfering-pads for horses, as heretofore made, are objectionable, for the reason that it is difficult to keep them from turning around or slipping up on the hoof after being placed in position.

To overcome these difficulties, the strap or band of the pad has been provided with a single projection or "start," which is pressed in between the upper side of the shoe and the bottom of the hoof, at a point at or near the front of the same, but owing to the "start" occupying such position, it is liable to be brought in contact with various objects or obstacles during the ordinary movements of the horse, and is frequently broken or bent and forced out of place, and the portion of the pad opposite to that where the "start" is placed continually slips up on the inclined surface of the hoof, which causes the band to chafe and to be soon worn out, beside being uncomfortable to the horse.

To provide an interfering-pad which shall effect the desired object and remain permanently in the position in which it is adjusted is the purpose of my invention, which consists in an interfering-pad having two "starts," so arranged as to fit between the shoe and hoof at points at or near the rear or heel-calks, in which position they are not exposed to be struck, and the pad is prevented from "riding up," and is held securely and permanently after being adjusted to its proper place.

To enable others skilled in the art to understand and use my invention, I will proceed to describe the manner in which I have carried it out.

In the said drawing—

A is a thick strip of rubber, provided with a series of conical projections, $a$, and riveted at $b\,b$ to a leather strap, B, provided with holes $c$, and a buckle, $d$, by which it may be secured around a horse's hoof.

By reference to fig. 2, it will be seen that the interfering-pad is so applied that the rubber projections $a$ point out from the inside of the hoof toward the inside of the next hoof of the same pair of the horse's legs, and, in this position the pad is prevented from slipping up or around by means of two "starts," $e\,e$, one of which fits between the hoof and shoe, at or near its rear or heel-calk inside the hoof, while the other "start" fits between the hoof and shoe at or near its rear or heel-calk outside of the hoof, by which construction the pad is held snugly down on the hoof, and the "starts" are not in a position to be struck when the hoof comes in contact with the ground.

As hereinbefore mentioned, I disclaim an interfering-pad provided with one "start" only, as I am aware such a pad has been made, but has not been successfully used, as it failed to accomplish the desired end; but What I do claim as my invention, and desire to secure by Letters Patent, is—

An interfering-pad, provided with two "starts," $e\,e$, which fit between the hoof and shoe at or near its rear or heel-calks, when constructed and arranged with respect to the leather strap B, and rubber strip A, provided with projections $a$, substantially in the manner and for the purpose set forth.

Witness my hand this 6th day of June, A. D. 1870.

JOHN SMITH.

Witnesses:
P. E. TESCHEMACHER,
L. E. BATCHELLER.